United States Patent
Eskicioglu et al.

(10) Patent No.: US 8,098,820 B2
(45) Date of Patent: *Jan. 17, 2012

(54) CONDITIONAL ACCESS SYSTEM FOR BROADCAST DIGITAL TELEVISION

(75) Inventors: Ahmet Mursit Eskicioglu, Indianapolis, IN (US); William Wesley Beyers, Carmel, IN (US); Izzat Hekmat Izzat, Carmel, IN (US); Edwin Arturo Heredia, San Jose, CA (US); Yousef Wasef Nijim, Carmel, IN (US)

(73) Assignee: Thomson Licensing, Boulogne Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/319,630

(22) Filed: Jan. 9, 2009

(65) Prior Publication Data

US 2009/0177585 A1    Jul. 9, 2009

Related U.S. Application Data

(62) Division of application No. 09/743,653, filed on Mar. 14, 2001, now Pat. No. 7,492,897.

(51) Int. Cl.
*H04N 7/167* (2006.01)
*H04N 7/16* (2006.01)
*H04L 9/00* (2006.01)
*H04L 9/30* (2006.01)

(52) U.S. Cl. ........ 380/231; 380/201; 380/239; 380/241; 380/282; 713/185; 726/28; 726/29; 725/6; 725/31

(58) Field of Classification Search ............... 726/26–29; 713/185, 182, 155, 156; 380/201, 210, 231, 380/239, 241, 278, 279, 282; 725/1, 5, 6, 725/25, 31
See application file for complete search history.

(56) References Cited

U.S. PATENT DOCUMENTS

| | | | |
|---|---|---|---|
| 4,484,217 A | | 11/1984 | Block et al. |
| 5,134,656 A | * | 7/1992 | Kudelski ........................ 380/228 |
| 5,144,663 A | * | 9/1992 | Kudelski et al. .............. 380/230 |
| 5,440,634 A | | 8/1995 | Jones et al. |
| 5,652,795 A | | 7/1997 | Dillon et al. |
| 5,740,246 A | | 4/1998 | Saito |
| 5,754,654 A | | 5/1998 | Hiroya et al. |

(Continued)

FOREIGN PATENT DOCUMENTS

EP    0128555    12/1984

(Continued)

OTHER PUBLICATIONS

EBU Project Group B/CA. "Functional Model of a Conditional Access System", EBU Review Technical, No. 266. Dec. 1995, pp. 64-77.

(Continued)

*Primary Examiner* — Zachary A Davis
(74) *Attorney, Agent, or Firm* — Robert D. Shedd; Paul P. Kiel

(57) ABSTRACT

A method for managing access to scrambled broadcast or transmitted events received from a variety of service providers (including broadcast television networks, cable television networks, digital satellite systems). Each service provider employs the same public key for descrambling the access information message thereby permitting a user to access events from various service providers without changing the smart card. The method may also be expanded to manage access to a scrambled package of broadcast events.

9 Claims, 3 Drawing Sheets

U.S. PATENT DOCUMENTS

| | | | |
|---|---|---|---|
| 5,796,829 A | 8/1998 | Newby et al. | |
| 5,867,579 A | 2/1999 | Saito | |
| 5,870,474 A * | 2/1999 | Wasilewski et al. | 380/211 |
| 6,289,314 B1 | 9/2001 | Matsuzaki et al. | |
| 6,671,675 B2 | 12/2003 | Iwamura | |
| 6,745,327 B1 | 6/2004 | Messing | |
| 6,904,522 B1 | 6/2005 | Benardeau et al. | |
| 7,181,014 B1 | 2/2007 | Srivastava | |
| 7,249,344 B1 | 7/2007 | Zeanah et al. | |

FOREIGN PATENT DOCUMENTS

| | | |
|---|---|---|
| EP | 0153837 | 9/1985 |
| EP | 0 314 871 B1 | 8/1991 |
| EP | 0798921 | 10/1997 |
| JP | 8-287014 | 11/1996 |
| JP | 9-233450 | 9/1997 |
| JP | 10-13808 | 1/1998 |
| JP | 10-150653 | 6/1998 |
| KR | 1997-0064233 | 9/1997 |
| KR | 19970064233 | 9/1997 |
| WO | WO 97/04553 | 2/1997 |
| WO | WO 97/28649 | 8/1997 |

OTHER PUBLICATIONS

Schneier, Bruce. Applied Cryptography, Second Edition: Protocols, Algorithms, and Source Code in C. John Wiley & Sons, Inc. 1996, pp. 31-34.

* cited by examiner

CONDITIONAL ACCESS SYSTEM FOR BROADCAST DIGITAL TELEVISION

This application is a divisional of U.S. application Ser. No. 09/743,653, filed Mar. 14, 2001, now U.S. Pat. No. 7,492,897, herein incorporated by reference.

FIELD OF THE INVENTION

This invention concerns a system that may be employed to provide conditional access (hereinafter referred as "CA") to multiple broadcasters by a single consumer electronic device, such as a set-top box or a digital television. Each device is capable of receiving broadcast or transmitted digital streams from a variety of broadcast sources.

BACKGROUND OF THE INVENTION

Today's NTSC televisions receive broadcast services from a variety of service providers (see FIG. 1). Most television receivers 12 are capable of receiving unscrambled, information or programs directly from broadcast 22, satellite 26 and cable 24 networks. Traditionally, cable networks 24 providing scrambled or encrypted programs usually require a separate stand-alone device 16a (e.g., a set-top box) to descramble or decrypt the program. Similarly, digital satellite systems usually provide scrambled or encrypted programs that also require the use of a separate set-top box 16b. These set-top boxes may utilize a removable smart card 18a, 18b which contain the necessary decrypting algorithms and keys. Typically, a separate set-top box is required for each service provider.

In the near future, broadcast digital television services may comprise 5 to 20 local channels, each of which may broadcast up to 10 simultaneous programs, some of these programs being pay-per-view programs. A user may want a mix of services from several of the different service providers. For example, a user may want to purchase all of the Indiana University basketball games from local channel 4 and purchase all of the Notre Dame football games from channel 13 and purchase all of the Indianapolis Colts games from channel 8. If each of these services were uniquely scrambled, the user would be burdened with purchasing multiple conditional access smart cards and swapping the cards as the user channel surfs.

SUMMARY OF THE INVENTION

The present invention resides, in part, in recognition of the described problem and, in part, in providing a solution to the problem. A single conditional access system that is capable of being used with a plurality of service providers without changing security modules is provided. Such a global conditional access system employs the concept of automatically debiting a user's account as a program is purchased versus logging all purchases and transmitting the log to the service provider for billing. To achieve the desired flexibility, the system employs a global public key that is used by all of the service providers; this is the public key for every smart card. The corresponding private key is loaded into the smart card. It is well within the teachings of this application that more than one public/private key pair may be used to minimize the impact should security be breached.

An event or program as described herein comprises one of the following: (1) audio/visual data such as a movie, weekly "television" show or a documentary; (2) textual data such as an electronic magazine, paper, or weather news; (3) computer software; (4) binary data such as images or (5) HTML data (e.g., web pages). The service providers include any provider broadcasting events, for example, traditional broadcast television networks, cable networks, digital satellite networks, providers of electronic list of events, such as electronic program guide providers, and in certain cases internet service providers.

Such a system can be based on public key technology. One public key (number) is available to all service providers. This is the public key for every smart card. Each smart card has stored therein a secret private key that can decrypt messages encrypted by the public key. The service provider sends a CA entitlement message in the transmission stream encrypted by the public key that contains the name of the service provider, the name, time, and cost of the program and the key to decrypt the keys used to scramble the program. This message is decrypted by the smart card, and the appropriate information is stored in the smart card for each event purchased. The smart card has a certain amount of credit for purchases that has been enabled by the bank. As long as the limit is not exceeded, programs can be purchased by the viewer. At some appropriate preprogrammed time, the smart card forces a telephone call to the CA center. Using another set of public and private keys, the CA center in cooperation with a bank receives billing information from the smart card and provides additional credit. The bank forwards the information and credits the appropriate service provider.

Generally, the present invention defines a method for providing conditional access to a restricted broadcast or transmitted event. First encrypted access information associated with the broadcast event is received. Next the access information is decrypted (or descrambled) and the cost of said broadcast event is verified to determine if it is less than a pre-stored cash reserve. Then the scrambled broadcast event is received from the service provider and it is descrambled.

In accordance with one aspect of the present invention, the method for managing access to a restricted broadcast or transmitted event from one of a plurality of service providers comprises receiving a plurality of access information messages associated with the transmitted event. Each of the access information messages being scrambled using a different public key and comprising data corresponding to the cost of the transmitted event. Then, decrypting or descrambling one of the access information messages using the pre-stored private key associated with the service provider and verifying that the cost of the transmitted event is less than a pre-stored cash reserve. Finally, receiving the scrambled transmitted event from one of the service providers and descrambling the transmitted event using the descrambling key.

In accordance with another aspect of the present invention the method for managing access to a restricted transmitted package of events comprises receiving digitally signed access information associated with the package of events via a direct channel and comprising data corresponding to the cost of the package of events. The signature on the access information is verified using a public key; the cost of the package is checked to ensure that it is less than a pre-stored cash reserve. When any one of the scrambled broadcast events belonging to the package is received from the service provider, its access information is decrypted to obtain the descrambling key.

In accordance with yet another aspect of the present invention the method for managing access to a restricted transmitted event comprises transferring, from a bank, a cash reserve to a smart card; receiving, from a service provider, an encrypted event key and the cost of the event; passing the event key and purchase information to the smart card which is coupled to the digital video apparatus. Next, the cost of the event is verified to determine that it is less than the stored cash reserve and the cost is deducted. The encrypted event key is decrypted and the scrambled event is received and then passed to the smart card where it is descrambled using the decrypted event key. Finally, the descrambled event is transferred to the digital video apparatus.

These and other aspects of the invention will be explained with reference to a preferred embodiment of the invention shown in the accompanying Drawings.

DETAILED DESCRIPTION OF THE DRAWING

The present invention provides a conditional access system, which may be utilized to obtain services from one of a plurality of sources. The conditional access system when implemented within a digital television (DTV), or set-top box or the like, permits a user to receive scrambled events from more than one service provider without swapping conditional access modules or smart cards. Alternately, the functionality of the smart card may be embedded within the DTV. Such a conditional access system may act as a toll bridge for access to services thereby permitting a mechanism for the manufacturer of the DTV to collect fees based on use of its DTV. Similarly, this invention may be implemented within a set-top box (STB); for simplicity, the below description of the invention will be directed towards an implementation using a digital television and a smart card coupled thereto.

Figure 1:
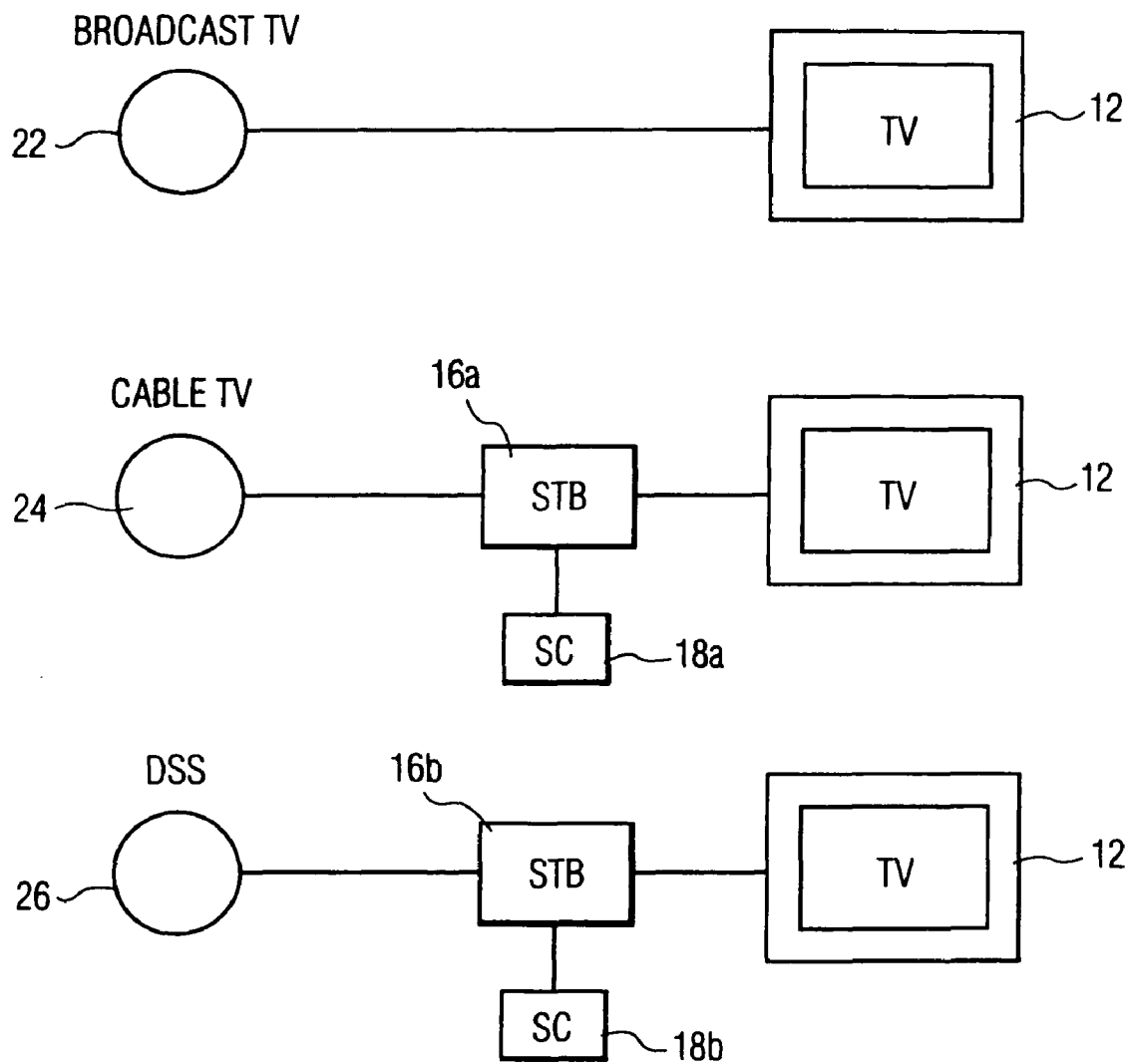
FIG. 1 is a block diagram illustrating a prior art configuration for interconnecting consumer electronic devices to a variety of service providers.
Figure 2:
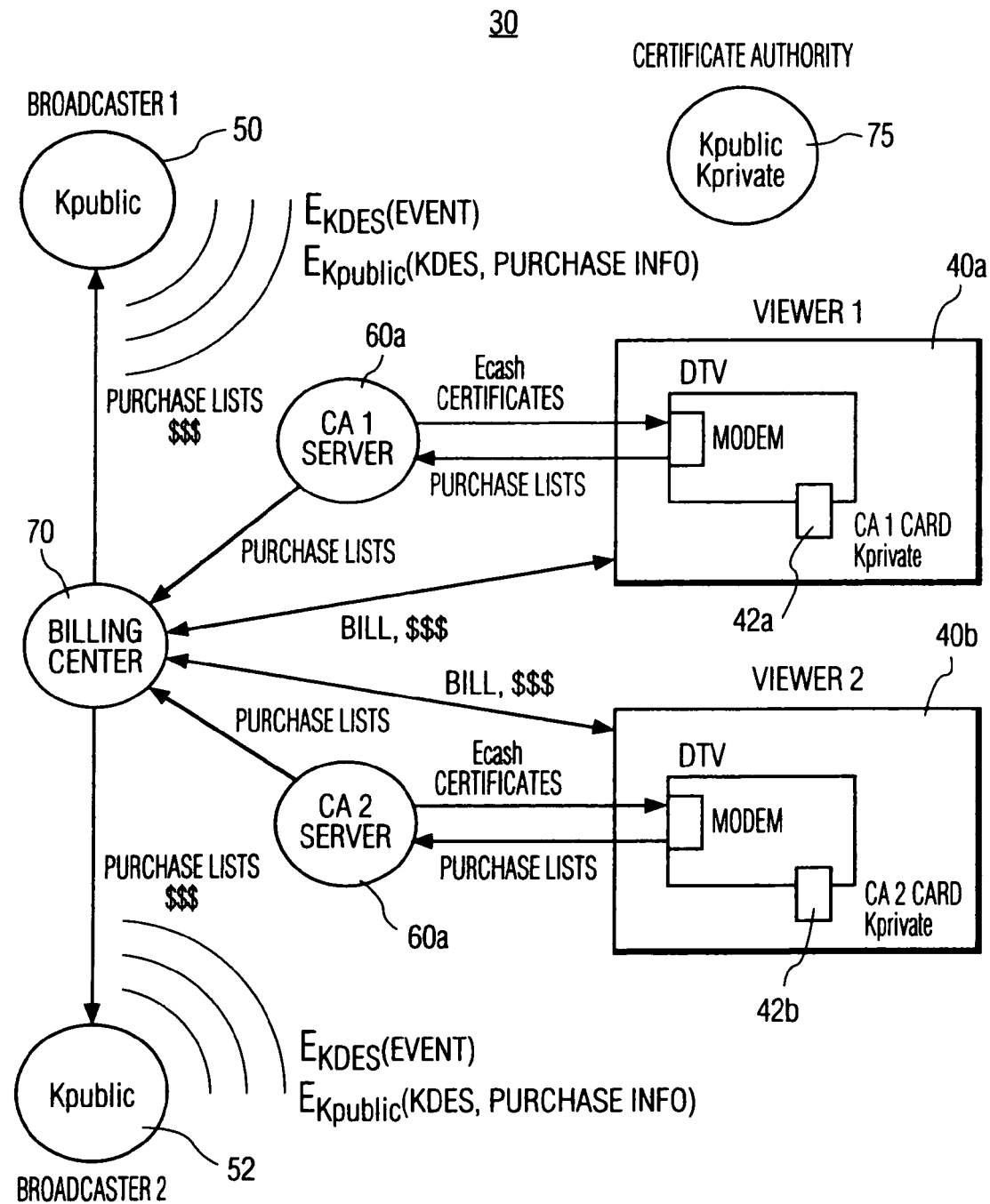
FIG. 2 is a block diagram illustrating one architecture for interfacing a common digital television to a plurality of terrestrial broadcasters.

In FIG. 2, system 30 depicts the general architecture for managing access to a digital television (DTV) 40a, 40b. For simplicity the following description will be limited to a single DTV 40a. Similar element numbers define the same functional element. Smart Card (SC) 42a is inserted into or coupled to a smart card reader (not shown) of DTV 40a; a bus interconnects DTV 40a and SC 42a thereby permitting the transfer of data therebetween. Such smart cards include, for example, ISO 7816 cards complying with National Renewable Security Standard (NRSS) Part A or PCMCIA cards complying with NRSS Part B. This inventive concept is not limited to smart cards per se, but can be employed with conditional access modules. Conceptually, when such a smart card is coupled to a smart card reader, the functionality of the smart card may be considered to be a part of the functionality of the digital television thus removing the "boundaries" created by the physical card body of the smart card.

DTV 40a can receive services from a plurality of service providers (SPs), such as a broadcast television SPs 50 and 52, a cable television (not shown), and a satellite system (not shown). This invention finds benefit in terrestrial broadcasting. Certificate authority 75 is not directly connected to either the service providers or DTV 40a but issues digital certificates and public and private key pairs, which are used as, explained below. It is within the scope of this invention that the role of certificate authority 75 may be performed by the service providers in collaboration with the manufacturer of the DTV 40a. Billing center 70 is utilized to manage the user's accounts; updated information is provided as users make arrangements to purchase additional services and as these services are consumed or used.

Such a Conditional Access (CA) system designed for DTV broadcast technology is a transport-based system. This means that CA information for a particular broadcaster is transmitted only on its own RF channel. Each broadcaster is responsible for its own information and hence, there is no need for pre-established code of conducts to coordinate and/or synchronize information among several broadcasters. Further, the CA system is based on E-cash card loading. A user preloads his/her card with a certain amount of cash (from debit or credit accounts), and then uses the card to buy event packages, pay for monthly subscriptions, or buy specific programs in PPV mode. An event package may include, for example, all the games of your favorite professional sports franchise or all the late Sunday movies on one or more virtual channels.

The broadcast channel is used only to deliver the services and information for access to these services. All the remaining transactions are carried out using a return channel (i.e., a modem and a phone connection). Broadcasting of addressable messages is not needed. The broadcast services are protected using a common scrambling algorithm. The keys used in this process and event purchase information are encrypted with a global public key, and delivered to the user via the MPEG-2 stream. For event packages, package certificates are sent to the user, from the CA server 60a, via the return channel. As described below in more detail, certificates are usually signed to ensure integrity of the certificate. That is, to ensure that the proper and unmodified certificate is received from the sender. Services are accessed through a renewable security module, i.e., and a smart card.

Symmetric key cryptography involves the use of the same algorithm and key for both encryption and decryption. The foundation of public-key cryptography is the use of two related keys, one public and one private. The private key is a secret key and it is computationally unfeasible to deduce the private key from the public key, which is publicly available. Anyone with a public key can encrypt a message but only the person or device having the associated and predetermined private key can decrypt it. Similarly, a message can be encrypted by a private key and anyone with access to the public key can decrypt that message. Encrypting messages using a private key may be referred to as "signing" because anyone holding the public key can verify that the message was sent by the party having the private key. This may be thought of as being analogous to verifying a signature on a document.

A digitally signed message is a message sent in the clear (i.e., unencrypted) having a signature attached thereto. The attached signature is produced by encrypting either the message itself or a digest of the message; a digest of the message is obtained by hashing the message. (Hashing involves subjecting the message to a one-way hashing algorithm, such as MD5 developed by Ron Rivest or SHA-1 developed by the National Institute of Standards and Technology (NIST) and the National Security Agency (NSA) prior to encrypting the message.) Thus the recipient of the signed message can verify the integrity (i.e., the source or origin) of the message. (In comparison, a public key certificate or digital certificate is a message, containing a public key sent in the clear having a signature attached thereto.) Signature verification involves checking the signature by decryption.

As defined above, the five essential components of the CA system are the broadcaster, the CA vendor, the billing center (e.g., a bank), the end user, and the Certificate Authority. FIG.

2 illustrates the overall system architecture, and identifies these five components with their communication links and data flows.

The end user communicates with the CA vendor for downloading certificates through a point-to-point link such as a telephone line. The telephone line is used for automatic transactions and for voice connection when necessary. For automatic transactions, one enabling protocol is the Point-to-Point Protocol (PPP). Security is implemented at the application layer using private protocols.

Communication between the CA vendor and the broadcaster may be established through a Local Area Network (LAN) or Wide Area Network (WAN). As before, security is embedded at the application level using privately-defined protocols running over existing internetworking protocols. The broadcast facility equipment needed to protect the broadcast streams can be an off-the-shelf product available from multiple CA vendors.

Broadcasters are responsible for delivering: (1) the services, and (2) the entitlement messages. Such entitlement messages include access information (AIM) messages described below in more detail, (or alternatively entitlement control messages and entitlement management messages) that allow any user to buy those services. Communication between a broadcaster and the user therefore follows the point-to-multipoint model of broadcast technology. Broadcast AIMs do not contain addresses unique to each user or subscriber, which is typical with satellite or cable systems.

If DTV 40a does not have a back channel connection needed to communicate with the CA server then loading cash to the card requires the user to either access a DTV unit with back-channel support or go to a particular location (bank, ATM, vendor's regional office) to have the card loaded. The CA operators act like the card holder's or user's bank, while the billing center acts like the merchant's bank. The card association could be the middleman between the CA operators and the broadcasters' banks that provides a transaction settlement service. The fixed amount of "cash" loaded into the smart card or conditional access module can now be used to pay of services offered by a broadcaster.

Whichever cash transfer mechanism is employed, the user requests a transfer of a specific amount of money to the CA card from a credit or debit account. After proper verification of the subject's identity and validation of user resources, the transaction is authorized, and the nominal amount of money is stored in the CA card.

Once money is loaded into the card, a user can buy any number of services offered by broadcasters. Each purchase reduces the amount of available money in the card by the service price. The services offered by broadcasters can be classified into two categories; PPV events and packages. An event is a TV program with an allocated slot in a program guide and a package is simply a collection of events. Examples of packages are (1) all the NBA games in a given season, (2) the late Sunday movies on one or more virtual channels, (3) subscription to a particular virtual channel such as HBO. All events must have one or more of their audiovisual streams scrambled using a common symmetric key algorithm. Entitlement packages, which contain purchase information and descrambling keys, have to be encrypted with a common public-key algorithm.

Upon purchase of an event, a record may be stored in the smart card which may be later transferred to the CA vendor. Once the stored purchase information is sent to the CA database, a CA vendor can pay broadcasters for the provided services. In addition, each smart card has non-volatile memory to keep the following information.

A 32-bit field represents the card serial number. A 128-bit BCD field for the user (credit or debit) card number. A 10-byte field for the CA server phone number. A 10-byte field for an alternate CA server phone number. A 40-bit BCD field to store the amount of money available to the user. A field for a signature on the last E-cash certificate. An 8-bit field to store a threshold value to inform the user that the available E-cash is less than a predetermined threshold or to initiate an automatic call back to the CA server to add money. A 40-bit BCD field for the amount of money downloaded to the card without user involvement when E-cash is less than the threshold. The amount is determined by the user and sent to the CA server during card activation. If this value is zero, automatic E-cash download will not be allowed. Two 768-bit fields for storing the private key for decrypting the AIMs and for storing the public key for verifying the signature on certificates. An 21-byte field for storing the DES key for descrambling the broadcast services. Two 96-byte fields for storing the key to replace the current private key and for the key to replace the current verification key. An 8-byte field for storing the symmetric DES key for secure communication with the CA server is also provided. It is within the scope of this invention that a scrambling algorithm may be a cipher other than DES.

The card must store information for PPV events and the packages purchased by the user. If the card memory is full, the user will not be allowed to purchase additional events.

Data exchange between the card and the host is based on a well-defined common interface, i.e., the National Renewable Security Standard (NRSS), EIA-679 Part A or Part B. Since the phone line is a widely available physical link, the chosen protocol between the CA server and the host is the Point-to-Point protocol (PPP), RFC 1548, adopted as Standard 51 with security provided within PPP datagrams. The technological innovation described herein does not preclude the use of alternative protocols different from PPP on the return channel.

PPP is a protocol based on the HDLC standards of ISO, as adopted by the ITU-T for X.25 systems. It was developed by IETF to transport datagrams from multiple protocols over point-to-point links. The frame format is a 16 bit protocol field (defined in RFC 1700, "Assigned Numbers"), followed by an information field of variable length and then followed by a padding field containing optional bytes added to adjust the frame length (if required by the receiving protocol).

For exchanging data between the card and the CA server, a new protocol is defined, having a protocol field value 0x00FF. The value of the padding field is always zero for this new protocol. The new protocol provides reliable transmission using acknowledgment (ACK) and negative acknowledgment (NACK) messages which are inserted into the first byte of the Information field both messages utilizing an 8-bit uimsbf format.

An ACK may be followed by information (piggyback acknowledgment) sent as a reply. If the receiving end detects a corrupted message, it responds with a NACK, and requests retransmission by the sender.

Using the above protocol, the smart card initiates a callback to the CA server under any of the following conditions:

1. The card has been inserted into the DTV for the first time.
2. The user has entered a request for an advanced package purchase using a displayed menu.
3. The smart card memory is full.
4. The local time is within the interval [1 am-6 am] and there are new records to be sent.
5. The card has received a notification for a new private key or verification key.

6. The smart card money is less than the specified threshold and automatic E-cash download is enabled.
7. The user has entered a request for money using a displayed menu.
8. The user has entered a request to cancel a package purchase.

Depending on the condition, the card sends an initial alerting message to inform the CA server about the user and the purpose of the call.

When the user inserts the card into the DTV for the first time, the information specific to the card is sent to the CA server for registration. This information is encrypted with Kcallback.

Card→CA server: Alert message (with alert_type=0x01)
Card←CA server: ACK message
Card→CA server: Card information message
Card←CA server: ACK message An advanced purchase can be made using a displayed menu. In response to the user request, the CA server sends a package certificate that will be saved on the card. For example, Card→CA server: Alert message (with alert_type=0x02)
Card←CA server: ACK message|Signed package certificate message
Card→CA server: ACK message The Package Certificate format contains the following fields. An 8-bit field that indicates a package certificate message. Two values are possible, one for renewable package subscription and one for non-renewable package subscription. A 32-bit field that identifies the registration authority that assigns values to the provider_index field. A 16-bit field that identifies the content provider. This unique number is registered with the registration authority identified by the format_identifier. A 16-bit field that identifies the transport stream where the event is being carried. A 16 bit field that indicates the package identifier. An 8-bit field for the title field. A variable length field for the title of the package using ASCII with Latin-1 extensions. A 40-bit field which indicates the price of the package in BCD format. A 24-bit field which indicates the expiration date of the package.

The PPV event purchase records are temporarily stored in the card until after the event is broadcast. They are sent to the CA server without user involvement and when either
(i) the card memory is unable to store more records or
(ii) the local time is in the interval [1 am-6 am] and there are new records to be sent.
All records are encrypted with Kcallback.
(i) Smart card memory is full
Card→CA server: Alert message (with alert_type=0x03)
Card←CA server: ACK message
Card→CA server: A variable number of encrypted PPV event purchase records
Card←CA server: ACK message
(ii) The local time is within the interval [1 am-6 am] and there are new records to be sent
Card→CA server: Alert message (with alert_type=0x04)
Card←CA server: ACK message
Card→CA server: A variable number of encrypted PPV event purchase records
Card←CA server: ACK message When the private key or verification key needs to be replaced, a notification is sent to the cards using the broadcast channel. Each user is then required to initiate a callback to receive the new key.
Card→CA server: Alert message (with alert_type=0x05)
Card←CA server: ACK message|Key replacement message
Card→CA server: ACK message Money is added to the card when;
1. the smart card money is less than a specified threshold or
2. the user enters a request for money using a displayed menu or
3. the card is taken to a remote location (if there is no local phone connection).

In all cases, the entity providing the money verifies the credit or debit card information, generates an E-cash Certificate (ECC), and sends it to the card. The ECC message format is an 8-bit field for the message type and 40-bit field to hold the BCD value of the amount of money to be added to the smart card.

1) Automatic E-cash download is enabled:
Card→CA server: Alert message (with alert_type=0x06)
Card←CA server: ACK message
Card→CA server: Signature on E-cash
Card←CA server: ACK|Signed E-cash certificate message
Card→CA server: ACK message 2) The E-cash Certificate contains the predefined, fixed amount of E-cash. Automatic E-cash download is disabled. The user proceeds as follows;
Card→CA server: Alert message (with alert_type=0x07)
Card←CA server: ACK message
Card→CA server: Signature on E-cash|E-cash amount message
Card←CA server: ACK message|Signed E-cash certificate message
Card→CA server: ACK message The user can cancel a purchase by using a menu displayed on the screen. The action taken by the card depends on the type of the purchase:
(i) Package purchase: A call is initiated to the CA server.
Card→CA server: Alert message (with alert_type=0x08)
Card←CA server: ACK message
Card→CA server: Canceled package purchase record
Card←CA server: ACK message|Signed E-cash certificate message
Card→CA server: ACK message
(ii) PPV event purchase: If the deadline for canceling the event has not been reached, the chosen record is deleted entirely.

The AIMs are carried as private data in the adaptation field of the Transport Stream packets carrying video data. These AIMs could also be carried in the Transport Stream with different PIDs using the tools and functions available for ECM transmission in MPEG-2. The adaptation_field_control bits shall be '10' (Adaptation field only, no payload) or '11' (adaptation field followed by payload). The maximum cycle time for AIM messages with the same AIM_id shall be 500 ms.

The bit-stream syntax for the Access Information Message contains the following fields. A unique 8-bit identifier of this access information message. The AIM_id field is the second byte in the private data section of the adaptation field. The first byte is allocated for identifying the public key used in protecting the AIM (if multiple public keys are used in a given DMA). An 8-bit field specifying the number of bytes in the AIM immediately following the AIM_length field. A 32-bit field that identifies the registration authority that assigns values to the provider_index field. A 16-bit field that identifies the content provider. This unique number is registered with the registration authority identified by the format_identifier. A 24-bit field that identifies a particular TV program or event. Assigned by the content provider identified by provider_index, it identifies uniquely all those programs registered in the content provider data base. A 16-bit field that identifies the Transport Stream where the event is being carried. A 16-bit field that identifies uniquely the particular service where the event is being transmitted. A 14-bit field that identifies uniquely a particular event within a given service of this Transport Stream. While program_event_id is a value that identifies an event for a content provider, event_id is the program guide index of an event. A broadcaster who acts simultaneously as a content provider may want to have both numbers equal, but this may not be valid otherwise. A 32-bit field indicating the event start time. A 20-bit field indicating the length of the event measured in seconds. A 10-byte field for storing the first 10 characters of the English title for the event that this message describes. If the actual title has less than 10 characters, then the title segment must be padded with ESC characters before including it in this field. A 5-byte BCD field indicating the cost of the event. A 16-bit field that indicates the packages to which this event belongs. The most-significant bit corresponds to the first package while the least significant bit corresponds to the 16-th package. If the event belongs to the k-th package, then the k-th bit of this field shall be set to one. More than one bit can be set to one to show an event that belongs to multiple packages. A 64-bit field for the DES key (or a 168-bit field for the TDES key) necessary for de-scrambling the video and audio signals for the event under consideration. A 40-bit field indicating that the user needs to obtain a new private key or verification key by calling the CA server. If flag is set to 1, the key needs to be replaced until the indicated deadline. An 8-bit field for identifying the total length (in bytes) of the AIM descriptor list that follows.

In one embodiment of the present invention, entitlement management messages (ECMs) may be used instead of AIMs. The format of the ECM is privately defined according to MPEG-2 and ATSC specifications. A particular format that may be used comprises an 8-bit table identification field, 3 indicator bits, a 12-bit section length field, an 8-bit protocol version field, a 5 bit version number field, 2 section number fields, a public key field, a transport stream identification field, major and minor channel number fields, 2 event identification fields, a stream PID and descriptors length fields, a cryption check field, a stuffing bytes field, and a 32-bit CRC field.

The security of the system is based on standard and widely accepted public key and symmetric key algorithms. The algorithms chosen are RSA for public key encryption and TDES and/or DES for symmetric key scrambling. There is a global RSA public/private key pair, Kpub/Kpri, for the entire system. The public key is shared by all the broadcasters and the corresponding private key is placed in the tamper-proof NRSS-A based smart cards, distributed by the CA providers to the consumers. This public key is used to protect the AIMs generated at the head-end.

The AIMs, encrypted under the public key, carry the control words (CWs) which are symmetric DES keys, KDES, used in scrambling the audio/video content in the ECB mode. After decrypting the AIMs with its private key, the card obtains the DES keys and descrambles audio/video streams. At the head-end: Scrambling: $E_{KDES}$(A/V stream), Encryption: $E_{Kpub}$(AIM). On the card: Decryption: $D_{Kpri}(E_{Kpub}$(AIM)), Descrambling: $D_{KDES}(E_{KDES}$(A/V stream)).

The security of the system can be improved in a number of ways. One feasible approach is to use multiple public keys at the head-end for encrypting the AIMs. Such use of multiple keys may find benefit in areas of overlapping markets, for example, the user can receive terrestrial digital broadcast from more than major market. Another example would be if the receiver population in a given DMA is divided into distinct subsets and each subset is assigned a different private key, an attack on one private key would not compromise the system.

For example, encryption at the head-end may involve four keys, $E_{Kpub1}$(AIM), $E_{Kpub2}$(AIM), $E_{Kpub3}$(AIM), $E_{Kpub4}$(AIM). Decryption on the card would then be based on one of the following four keys, Card type 1: $D_{Kpri1}(E_{Kpub1}$(AIM)), Card type 2: $D_{Kpri2}(E_{Kpub2}$(AIM)), Card type 3: $D_{Kpri2}(E_{Kpub2}$(AIM)), and Card type 4: $D_{Kpri4}(E_{Kpub4}$(AIM)). The public key used in encrypting the AIM is identified using the identifier in the first byte of the adaptation field. This field indicates the public key used in encrypting the AIM. If the value is i, the active public key is Kpubi.

The E-cash Certificates carry the amount of money to be added to the card. The Package Certificates include the price of the package offered to the customer. Since both of the certificates carry sensitive data, there needs to be a signature mechanism to ensure the integrity of these messages. Therefore, all certificates are sent via a channel with a feedback path, for example, a back channel using a MODEM.

Although the Package Certificates are normally sent from the CA server, there may be different sources (e.g., ATMs or other special terminals) for downloading E-cash to the card. If each source signs with a unique private key, the DTV needs to keep multiple public keys. The present CA system employs an ID-based authentication scheme to allow signature verification using only one public key.

Figure 3:
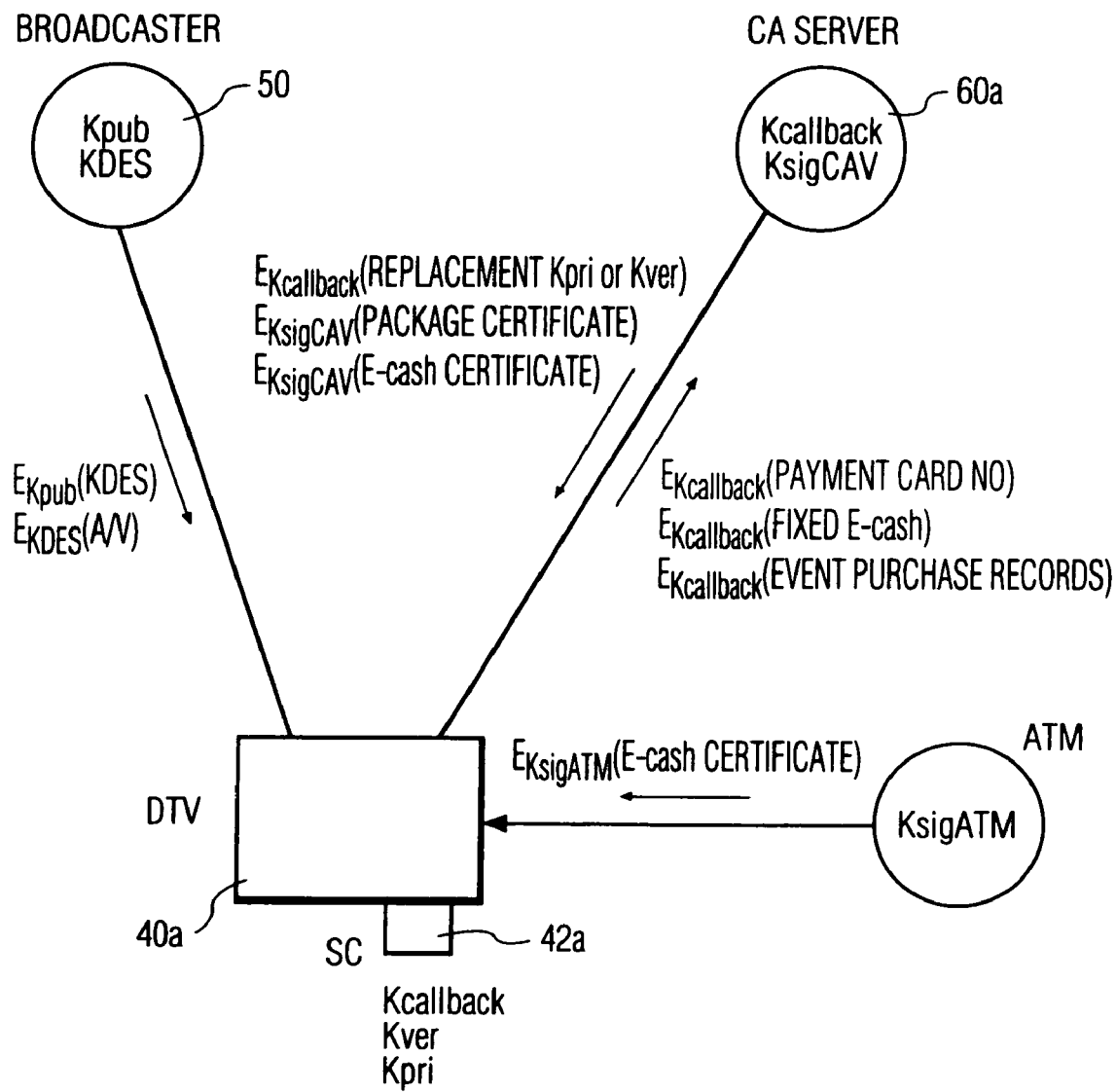
FIG. 3 is a block diagram of an exemplary implementation of a system for managing access to a device in accordance with the invention.

As mentioned earlier, to participate in the scrambling, encryption and signature protocols, the broadcasters, CA servers and the smart cards will need to store certain keys. The storage and use of all types of keys are summarized in FIG. 3.

Kpub is kept at the broadcaster site, and is used to encrypt the DES keys that are locally generated to scramble the A/V streams. The card has the corresponding Kpri for recovering the DES keys.

Ksig is used to sign package and E-cash certificates. The signed certificates are verified with Kver stored on the card. In the ID-based scheme described in Section 8.2, Ksig is unique for each certificate provider (CA vendors, ATMs, etc.) but Kver is common to all certificate providers.

Kcallback is shared between the card and the CA server, and is used to encrypt sensitive information exchanged. The information sent from the card to the CA server is payment card no, fixed E-cash and event purchase records. When needed, Kpri and Kver are replaced by the CA server. Kcallback may be unique for each card. Its replacement is only possible by sending a new card to the user.

While the invention has been described in detail with respect to numerous embodiments thereof, it will be apparent that upon reading and understanding of the foregoing, numerous alterations to the described embodiment will occur to those skilled in the art and it is intended to include such alterations within the scope of the appended claims. For example, this invention may be utilized successfully with both digital terrestrial broadcast and transmitted satellite digital signals.

The invention claimed is:

1. A method for managing access to a restricted transmitted event, said method comprising:
   receiving encrypted access information associated with said transmitted event from a particular one of a plurality of service providers, the encrypted access information from each of said plurality of service providers being encrypted with a first global public key shared among said plurality of service providers, said received access information comprising data corresponding to the cost of said transmitted event;

decrypting said received access information in a conditional access module using a first global private key associated with the first global public key and shared among a plurality of subscribers, wherein the first global public key and the first global private key are replaced with a second global public key shared among a plurality of service providers, and a second global private key shared among a plurality of subscribers, respectively;

verifying, in said conditional access module, that the cost of said transmitted event is less than a pre-stored cash reserve;

receiving said transmitted event from said service provider, said transmitted event being scrambled; and descrambling said transmitted event in said conditional access module.

2. The method of claim 1, wherein said access information further comprises an event descrambling key and purchase information, said purchase information comprising channel identification data, event identity data, date and time stamp data, and billing data.

3. The method of claim 2, further comprising the step of transferring data associated with said purchased transmitted event to said service provider to update a user's account information.

4. The method of claim 3, wherein said conditional access module comprises a smart card.

5. The method of claim 4, wherein said smart card comprises a card body with a plurality of terminals arranged on a surface of said card body in accordance with one of ISO 7816 and PCMCIA card standards.

6. The method of claim 1, wherein said transmitted event comprises one of audio/video program data, textual data, computer software, and HTML data.

7. The method of claim 1, wherein said plurality of service providers comprises one of terrestrial television network, cable network, digital satellite network, electronic program guide provider, and internet service provider.

8. The method of claim 1, wherein said transmitted event comprises a package of programs.

9. The method of claim 1, wherein the access information is transmitted in transport packets and the method further comprises the step of identifying the first global public key and the corresponding first global private key using an identifier included in a header portion of the transport packets.

* * * * *